(12) United States Patent
Lim et al.

(10) Patent No.: US 9,957,456 B2
(45) Date of Patent: May 1, 2018

(54) CARBON LAYER DERIVED FROM CARBIDE CERAMICS AND PREPARATION METHOD THEREOF

(71) Applicant: KSM Co., LTD., Gimpo-Si, Gyeonggi-do (KR)

(72) Inventors: Dae Soon Lim, Seoul (KR); Min-gun Jeong, Seoul (KR); Seo-hyun Yoon, Seoul (KR)

(73) Assignee: KSM Co., Ltd., Gimpo-si, Gyeonggi-do (KR)

( * ) Notice: Subject to any disclaimer, the term of this patent is extended or adjusted under 35 U.S.C. 154(b) by 803 days.

(21) Appl. No.: 14/083,511

(22) Filed: Nov. 19, 2013

(65) Prior Publication Data

US 2014/0142007 A1   May 22, 2014

(30) Foreign Application Priority Data

Nov. 20, 2012   (KR) .................. 10-2012-0131680

(51) Int. Cl.
    *B23B 9/00*      (2006.01)
    *C10M 103/02*    (2006.01)
    *C04B 35/52*     (2006.01)

(52) U.S. Cl.
    CPC ......... *C10M 103/02* (2013.01); *C04B 35/521* (2013.01); *C04B 2235/3826* (2013.01); *C04B 2235/963* (2013.01); *C10M 2201/0613* (2013.01); *C10N 2230/06* (2013.01); *C10N 2250/08* (2013.01); *C10N 2270/00* (2013.01); *C10N 2280/00* (2013.01); *Y10T 428/24355* (2015.01); *Y10T 428/30* (2015.01)

(58) Field of Classification Search
    CPC ................ B22F 2303/00; B32B 9/007; C01B 31/022–31/0293; Y10T 428/30
    USPC ................ 428/408; 423/447.1, 448; 252/500
    See application file for complete search history.

(56) References Cited

U.S. PATENT DOCUMENTS

| 7,678,452 B2 | 3/2010 | Kim et al. |
| 2002/0041930 A1* | 4/2002 | Erdemir ............. C23C 16/029 427/249.7 |

FOREIGN PATENT DOCUMENTS

JP    2008-255003 A    10/2008

OTHER PUBLICATIONS

JP-2008-255003 (Machine translation provided).*

* cited by examiner

*Primary Examiner* — Daniel H Miller
(74) *Attorney, Agent, or Firm* — Alston & Bird LLP

(57) ABSTRACT

Provided is a carbon layer derived from carbide ceramics, wherein metal or non-metal atoms are extracted selectively from the surface of carbide ceramics to form voids, which, in turn, are filled with carbon synthesized by a carbon compound, thereby providing improved roughness and hardness, as well as to a method for preparing the same.

1 Claim, 10 Drawing Sheets

(a)

(b)

(a)          (b)

CARBON LAYER DERIVED FROM CARBIDE CERAMICS AND PREPARATION METHOD THEREOF

CROSS-REFERENCE TO RELATED APPLICATIONS

This application claims priority under 35 U.S.C. § 119 to Korean Patent Application No. 10-2012-0131680 filed on Nov. 20, 2012, in the Korean Intellectual Property Office, the disclosure of which is incorporated herein by reference in its entirety.

TECHNICAL FIELD

The following disclosure relates to a carbon layer derived from carbide ceramics and a method for preparing the same. More particularly, the following disclosure relates to a carbon layer derived from carbide ceramics, wherein metal or non-metal atoms are extracted selectively from the surface of carbide ceramics to form voids, which, in turn, are filled with carbon synthesized by a carbon compound, thereby providing improved roughness and hardness, as well as to a method for preparing the same.

BACKGROUND

In various mechanical parts, importance of a method for reducing frictional energy at a contact portion has been spotlighted more and more in order to improve the driving efficiency. To impart low-frictional and wear-resistant characteristics to such mechanical parts, coating technologies using different carbon-based materials have been used.

In particular, conventional diamond like carbon (DLC) or diamond coating processes are problematic in that they cause coating layer separation when a thick membrane is formed to a thickness of 3 μm or more, provide a very low membrane growth rate, and have poor cost-efficiency.

As a solution to the above-mentioned problems, a process for forming a carbide derived carbon (CDC) layer has been suggested. Such a process for forming a carbon membrane includes reacting carbide ceramics with a halogen gas at high temperature to extract metal or non-metal atoms from the surface of carbide ceramics, thereby forming a residual carbon layer. The thus formed carbon layer is called a CDC layer in general.

As compared to DLC or diamond coating, such a process for forming a CDC layer forms a carbon layer through the extraction of metal or non-metal atoms in carbide ceramics, and thus shows lower residual stress and allows formation of a carbon membrane with an infinite thickness. In addition, since nano-sized crystals having an onion like carbon (OLC), graphite or carbon nanotube structure are present inside a carbon layer having an amorphous or diamond structure, the CDC layer has a significantly low frictional coefficient.

However, in a CDC layer, voids are present on the surface and in the inner part thereof due to the extraction of metal or non-metal atoms. Furthermore, such voids cause degradation of roughness and hardness as compared to a carbon membrane formed by DLC or the like.

SUMMARY

An embodiment of the present disclosure is directed to providing a carbon layer coated on a mechanical part based on carbide ceramics and having improved roughness and hardness on the surface of carbide ceramics.

Another embodiment of the present disclosure is directed to providing a method for preparing a carbon layer derived from carbide ceramics.

In one general aspect, there is provided a carbon layer derived from carbide ceramics and having reduced voids and increased mechanical strength by extracting metal or non-metal atoms selectively from the surface of carbide ceramics to form a residual carbon layer having voids, which, in turn, are filled with carbon synthesized by a carbon compound.

The carbide ceramics are at least one selected from SiC, TiC, WC, $Fe_xC_y$ (wherein each of x and y independently represents an integer of 2-6), BC and alloys thereof, and the carbon with which the voids are filled is carbon synthesized by a carbon compound, wherein the carbon compound may be at least one selected from methane, acetylene, alcohols, ketones, organohalogen compounds and phenols.

In addition, the carbon layer derived from carbide ceramics according to an embodiment may further include carbon crystals having at least one structure selected from diamond, graphite, onion like carbon (OLC) and carbon nanotubes having a size of 1-100 nm.

According to another embodiment, the surface of the carbon layer has an RMS surface roughness of 5 nm-200 μm, frictional coefficient of 0.05-0.35 and a wearing ratio of $1.0 \times 10^{-8}$ $mm^3/Nm$-$7.0 \times 10^{-3}$ $mm^3/Nm$.

In another general aspect, there is provided a method for preparing a carbon layer derived from carbide ceramics, the method including the following steps of:
  (a) injecting a carbon compound and a halogen gas to an electric furnace, while carbide ceramics are passed through the electric furnace at 300-2000° C., and
  (b) carrying out a reaction for 0.5-20 hours after the injection to form a carbon layer on the carbide ceramics.

According to an embodiment, the method may further include, after step (b), maintaining the temperature of the electric furnace at 500-1000° C., and carrying out heat treatment while injecting hydrogen gas to the electric furnace to remove residues.

According to another embodiment, the halogen gas may be at least one selected from chlorine gas, fluorine gas, bromine gas, iodine gas and a mixed gas thereof.

According to still another embodiment, the carbon compound gas may have a concentration of 0.01-20 vol % and the halogen gas may have a concentration of 0.1-20 vol %.

According to yet another embodiment, the carbon compound may be injected in a gas or liquid phase simultaneously with the halogen gas, and injection of the carbon compound in a liquid phase may be carried out by passing the carbon compound through inert gas so that it is bubbled.

The carbon layer derived from carbide ceramics according to the present disclosure minimizes generation of voids to provide improved hardness and an excellent frictional coefficient and wearing ratio. Thus, when forming the coating layer according to the present disclosure on the surface of a part using a carbide ceramic material, it is possible to improve the hardness at a contact portion, to reduce the frictional coefficient and wearing ratio, thereby contributing to improvement of the overall service life and durability of the corresponding machine. Therefore, the carbon layer according to the present disclosure may be applied to various industrial fields using carbide ceramic materials, including the aerospace industry, large-scale plant industry, or the like.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EMBODIMENTS

Figure 1:
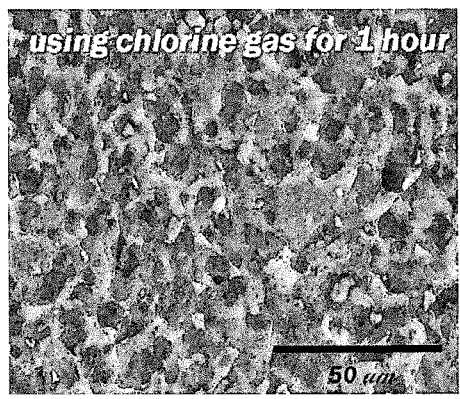
FIG. 1 is a scanning electron microscopy (SEM) image showing the surface of the carbon layer according to Example 1 as compared to the surface of the carbon layer according to Comparative Example 1.
Figure 1:
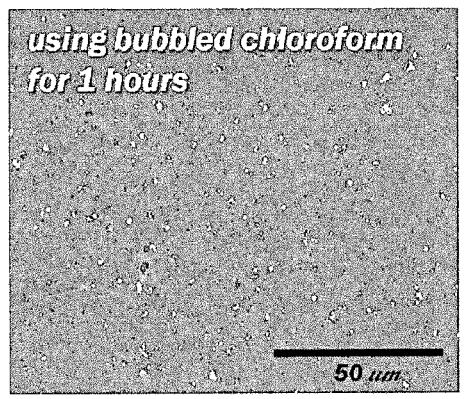

The advantages, features and aspects of the present disclosure will become apparent from the following description of the embodiments with reference to the accompanying drawings, which is set forth hereinafter.

In general, contact portions of various mechanical parts are damaged due to friction and wearing when they are coupled to other parts. Many attempts have been made to reduce the frictional energy of contact portions so as to reduce such damages. Among such attempts, in the case of mechanical parts based on carbide ceramics or coated with carbide ceramics, there has been suggested a method including reacting the carbide ceramics with a halogen gas at high temperature to form a carbon layer on the surface thereof. The carbon layer obtained by such a method is called carbide derived carbon (CDC) in general. The CDC layer is advantageous in that it causes no interlayer separation on the surface even if it is coated with a large thickness.

However, such carbon layers inevitably undergo extraction of metal or non-metal atoms due to the reaction with a halogen gas, and voids are formed at the extraction sites. Due to such voids, the carbon layers show an increase in roughness and have low hardness.

As a result, although the above-mentioned method for reacting carbide ceramics with a halogen gas at high temperature to form a carbon layer on the surface thereof has an advantage of the lack of interlayer separation on the surface, it has an disadvantage of degradation of hardness and roughness caused by the voids, leading to failure in commercialization.

In one aspect, there is provided a coating layer derived from carbide ceramics, the coating layer causing no interlayer separation even when forming a coating layer on carbide ceramics to a thickness of several micrometers or more, and showing improved hardness and roughness.

The coating layer derived from carbide ceramics according to the present disclosure is obtained by reacting carbide ceramics with a halogen gas at high temperature to form a carbon layer on the surface of carbide ceramics, while the voids formed by the extraction of metal or non-metal atoms from the surface of carbide ceramics are filled with carbon synthesized by a carbon compound at the same time.

The carbide ceramics are selected from SiC, TiC, WC, $Fe_xC_y$, BC and alloys thereof (wherein each of x and y independently represents an integer of 2-6).

In addition, the carbide ceramics may include single crystals, polycrystals, sintered bodies and mixed sintered bodies, and the extracted metal or non-metal atoms may be Si, Ti, W, Fe or B.

When carbide ceramics are reacted with a halogen gas at high temperature to form a carbide-derived carbon (CDC) layer, metal or non-metal atoms are extracted from the carbon layer to form voids, resulting in lower hardness. However, according to the present disclosure, the voids are filled with carbon to improve hardness.

When the voids are filled with carbon, the overall hardness of the carbon layer is improved as compared to the carbon layer before the voids are filled with carbon. This is because the voids are filled with carbon and the carbon serves to support the whole of the carbon layer, resulting in improvement of the overall hardness of the carbon layer.

The carbon with which the voids are filled is carbon synthesized by a carbon compound, and the carbon compound may be at least one selected from methane, acetylene, alcohols, ketones, organohalogen compounds and phenols.

The alcohols may be at least one selected from methanol, ethanol, isopropyl alcohol, butyl alcohol, ethylene glycol, propylene glycol and glycerol.

The ketones may be at least one selected from acetone, methyl ethyl ketone, ethyl isopropyl ketone, methyl isobutyl ketone and butanone.

The organohalogen compounds may be at least one selected from methylene chloride, chloroform, carbon tetrachloride, methyl chloroform, trichloropropene, ethylene dichloride, carbon tetrafluoride ($CF_4$), hexafluoroethane ($C_2F_6$), nitrogen trifluoride ($NF_3$) and sulfur hexafluoride ($SF_6$).

The phenols may be at least one selected from phenol, bisphenol, alkylphenols and nonylphenol.

In addition, the carbon compound may be reacted with the carbide ceramics in a liquid or gas phase. It is preferred that the carbon compound is reacted with the carbide ceramics in a gas phase at high temperature in view of easy decomposition of carbon. Further, when the carbon compound is reacted with the carbide ceramics in a liquid phase, it may be vaporized, for example, by bubbling with a halogen gas.

The carbon layer according to the present disclosure may further include carbon crystals having at least one structure selected from diamond, graphite, carbon nanotubes and onion like carbon (OLC) having a size of 1-100 nm. When the carbon layer further includes such additional carbon crystals, it is possible to improve the hardness, to reduce the frictional coefficient and to improve the overall mechanical properties of the carbon layer.

Particularly, as can be seen from the following Examples, the surface of the carbon layer according to the present disclosure has an RMS surface roughness of 5 nm-200 μm, frictional coefficient of 0.05-0.35 and a wearing ratio of $1.0\times10^{-8}$ mm$^3$/Nm-$7.0\times10^{-3}$ mm$^3$/Nm.

In another aspect, there is provided a method for preparing a carbon layer derived from carbide ceramics, the method including the following steps of:

(a) injecting a carbon compound and halogen gas to an electric furnace, while carbide ceramics are passed through the electric furnace at 300-2000° C., and (b) carrying out a reaction for 0.5-20 hours after the injection to form a carbon layer on the carbide ceramics.

In addition, the method may further include, after step (b), maintaining the temperature of the electric furnace at 500-1000° C., and carrying out heat treatment while injecting hydrogen gas to the electric furnace to remove residues.

The halogen gas may be at least one selected from chlorine gas, fluorine gas, bromine gas, iodine gas and a mixed gas thereof. When the carbon layer is formed on the carbide ceramics by injecting a halogen gas, it is possible for the carbon layer to have a large thickness while preventing interlayer separation on the surface.

However, also in this case, metal or non-metal atoms are decomposed and extracted from the carbon layer to form voids, and thus the generation of voids causes degradation of the overall hardness of the carbon layer.

In the carbon layer obtained by the method for preparing a carbon layer derived from carbide ceramics according to the present disclosure, the activated carbon atoms formed upon the extraction of metal or non-metal atoms are bound with a carbon compound activated at high temperature, and thus the carbon layer is grown while maintaining its crystal structure. Due to the crystals grown in the above-described manner, the voids generated during the preparation of the carbon layer are reduced, and any voids generated during the preparation of the carbon layer may be filled with carbon synthesized by the carbon compound.

In this manner, it is possible to reduce the generation of voids during the growth of a crystal structure, while any voids generated in the carbon layer are filled with carbon to improve the overall hardness of the carbon layer, which, otherwise may be degraded. Therefore, it is possible to improve the mechanical properties of the carbon layer.

Although the carbon compound may be injected in a liquid phase, it is injected preferably in a gas phase according to an embodiment of the method of the present disclosure. Therefore, when the carbon compound is present in a liquid phase, it may be injected after being vaporized, for example, by a bubbling method in which inert gas is passed through liquid. The inert gas may include helium, neon and argon.

While the voids are filled with carbon through the injection of a carbon compound gas, a crystal structure may be formed. In addition, the crystal structure thus formed may be grown by the continuous injection of the carbon compound gas, which contributes to improvement of the overall hardness of the carbon layer.

The crystal structure may form carbon crystals having at least one structure selected from diamond, graphite, CNT and OLD having a size of 1-100 nm. The carbon crystals having such a structure improve the hardness of the carbon layer and reduce the frictional coefficient, and thus are favorable to improvement of mechanical properties. The carbon compound may be at least one selected from methane, acetylene, alcohols, ketones, organohalogen compounds and phenols.

There is no particular limitation in the injection time of the carbon compound gas and interval from the injection of the halogen gas, as long as metal or non-metal atoms are extracted from the carbon layer by the injection of the halogen gas to form voids, which, in turn, are filled with carbon.

According to a preferred embodiment of the present disclosure, the carbon compound and the halogen gas may be injected at the same time in view of cost-efficiency and reaction efficiency.

In addition, when the carbon compound gas also provides the same effect as the injection of halogen gas, it is possible to inject the carbon compound only with no injection of halogen gas to form the carbon layer.

Preferably, after injecting the carbon compound gas to the electric furnace, reaction is carried out in the electric furnace for 0.5-20 hours. When the reaction time is less than 0.5 hours, it is not possible to fill the voids with a sufficient amount of carbon. On the other hand, when the reaction time is more than 20 hours, crystals are grown excessively, thereby affecting the fundamental physical and chemical properties of the resultant carbon layer. Additionally, in the latter case, reduction of voids makes infiltration of the reaction gas difficult and decreases the rate of forming a coating layer.

Particularly, the reaction is carried out preferably within a time of 0.5-20 hours, since it is possible to improve the hardness sufficiently and to accomplish an increase in thickness sufficient for the layer thus formed to function as a carbon layer within a shorter time as compared to the conventional method for forming a CDC layer.

Preferably, the reaction temperature of carbide ceramics with a carbon compound gas, i.e., the temperature of electric furnace is 300-2,000° C. When the deposition temperature is lower than 300° C., it is not possible to form a coating layer to a sufficient thickness. When the deposition temperature is higher than 2,000° C., such an excessively high temperature may cause a physical or chemical change in the resultant carbon layer.

Particularly, different reaction temperatures may be applied to different kinds of carbide ceramics in order to form a carbon layer having improved physical properties. In the case of SiC, the reaction temperature is preferably 850-1600° C. In the case of TiC, the reaction temperature is preferably 350-1200° C.

The carbon compound gas preferably has a concentration of 0.01-20 vol %. When the carbon compound gas has a concentration less than 0.01 vol %, it is not possible to reduce voids sufficiently after the carbon compound is decomposed and the voids are filled with carbon. When the carbon compound gas has a concentration higher than 20 vol %, voids are filled with an excessive amount of carbon to form a non-uniform deposition film, thereby interrupting growth of a carbon layer.

The halogen gas preferably has a concentration of 0.1-20 vol %. When the halogen gas is injected at a concentration less than 0.1 vol %, forming a carbon layer requires an excessively long time. When the halogen gas is injected at a concentration higher than 20 vol %, recombination of carbon atoms becomes difficult after extracting metal or non-metal atoms to generate an excessively large amount of voids, and thus any desired effect cannot be obtained through the deposition of carbide gas.

In addition, according to the method for preparing a carbon layer derived from carbide ceramics, at least one gas selected from argon, nitrogen and helium may be added to control the concentration of a gas. Hydrogen gas may be further added to improve the crystallinity of a carbon layer.

EXAMPLES

The examples and experiments will now be described. The following examples and experiments are for illustrative purposes only and not intended to limit the scope of this disclosure.

Example 1

The carbide ceramics used in this Example as a starting material is a SiC polycrystalline substrate sintered at high temperature. The SiC polycrystalline substrate is passed through a tube-like electric furnace, and the electric furnace is heated to 1,000° C.

Then, at the moment where the electric furnace is heated to 1000° C., liquid-phase chloroform that can be decomposed into chlorine and methane to serve also as halogen gas is injected to the electric furnace while being bubbled with argon gas. By virtue of such bubbling, liquid-phase chloroform is vaporized before it is introduced to the electric furnace. Herein, the liquid-phase chloroform is controlled in such a manner that it has a concentration of 5 vol % after vaporization, and is bubbled with argon gas. After introducing the bubbled chloroform to the electric furnace, it is allowed to react with the SiC polycrystalline substrate sintered at high temperature for 1 hour. After carrying out reaction for 1 hour, injection of chlorine gas and bubbled chloroform is stopped. However, injection of argon gas and hydrogen gas is maintained to carry out reaction at 800° C. for 2 hours, thereby removing residual chlorine compounds. In this manner, a sample coated with a finished carbon layer is obtained.

Example 2

Example 1 is repeated to obtain a sample, except that the reaction time of the bubbled chloroform with the SiC polycrystalline substrate sintered at high temperature is 15 minutes.

Example 3

Example 1 is repeated to obtain a sample, except that the reaction time of the bubbled chloroform with the SiC polycrystalline substrate sintered at high temperature is 30 minutes.

Example 4

Example 1 is repeated to obtain a sample, except that the reaction time of the bubbled chloroform with the SIC polycrystalline substrate sintered at high temperature is 2 hours.

Example 5

Example 1 is repeated to obtain a sample, except that the reaction time of the bubbled chloroform with the SIC polycrystalline substrate sintered at high temperature is 4 hours.

Example 6

Example 4 is repeated to obtain a sample, except that no bubbled chloroform is injected, chlorine gas is injected as halogen gas at a concentration of 5 vol % and methane gas is injected at a concentration of 2 vol % at the same time.

Example 7

Example 5 is repeated to obtain a sample, except that no bubbled chloroform is injected, chlorine gas is injected as halogen gas at a concentration of 5 vol % and methane gas is injected at a concentration of 2 vol % at the same time.

Comparative Example 1

Example 1 is repeated to obtain a sample, except that no bubbled chloroform is injected and chlorine gas is injected as halogen gas at a concentration of 5 vol %.

Comparative Example 2

Example 2 is repeated to obtain a sample, except that no bubbled chloroform is injected and chlorine gas is injected as halogen gas at a concentration of 5 vol %.

Comparative Example 3

Example 3 is repeated to obtain a sample, except that no bubbled chloroform is injected and chlorine gas is injected as halogen gas at a concentration of 5 vol %.

Comparative Example 4

Example 4 is repeated to obtain a sample, except that no bubbled chloroform is injected and chlorine gas is injected as halogen gas at a concentration of 5 vol %.

Comparative Example 5

Example 5 is repeated to obtain a sample, except that no bubbled chloroform is injected and chlorine gas is injected as halogen gas at a concentration of 5 vol %.

Test Example 1: Determination of Appearance of Carbon Layer Surface

Each of the samples according to Example 1 and Comparative Example 1 is subjected to scanning electron microscopy (SEM) to observe the surface thereof. The results are shown in FIG. 1.

As can be seen from FIG. 1, portion (a) corresponding to Example 1 shows a smaller amount of voids on the surface as compared to portion (b) corresponding to Comparative Example 1. It is thought that this is because the voids formed on the carbon layer by chlorine gas are filled with carbon decomposed from chloroform.

Figure 2:
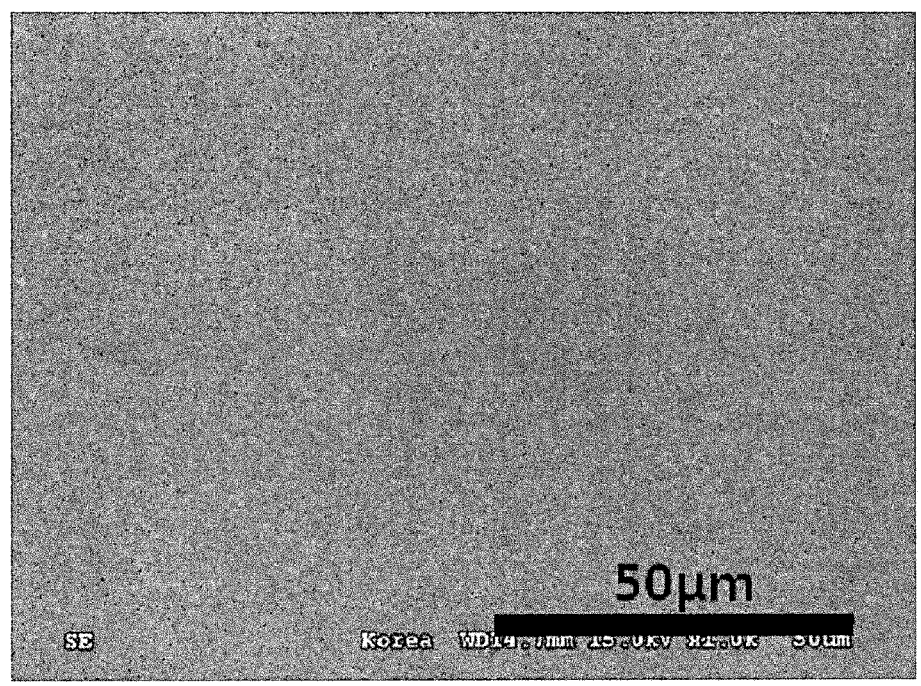
FIG. 2 is an SEM image showing the surface of the carbon layer according to Example 6.
Figure 3:
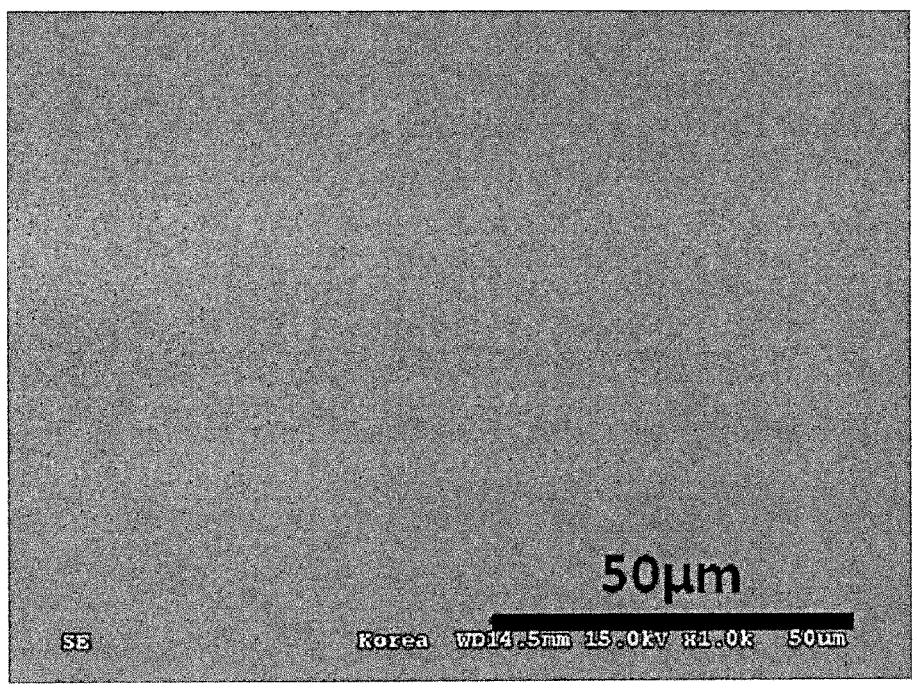
FIG. 3 is an SEM image showing the surface of the carbon layer according to Example 7.

In addition, the surface of each of the samples according to Examples 6 and 7 is observed by SEM images. It can be seen that voids are reduced and surface roughness is also decreased in each case (FIG. 2 and FIG. 3).

It can be seen from the above results that the depletion of carbon atoms generated by extraction of Si atoms during the CDC forming reaction of SIC is filled with carbon atoms in methane gas, so that the resultant CDC layer shows little voids on the surface thereof.

Figure 4:
FIG. 4 is an SEM image showing the formation of an additional carbon layer through the decomposition and synthesis of methane on the surface in addition to the carbon layer obtained through etching according to Example 7.

In addition, when the reaction time is excessively long or methane gas is added in an excessively large amount as in the case of Example 7, an additional carbon layer is formed by the decomposition and synthesis of methane in addition to the carbon layer formed by etching, as shown in FIG. 4.

Test Example 2: Determination of Thickness of Carbon Layer Surface

Each of the samples according to Examples 1 to 5 and Comparative Examples 1 to 5 is subjected to a test for determination of the thickness of each carbon layer. Herein, the thickness is determined by using a scanning electron microscope (SEM). The results are shown in the following Table 1, FIG. 5 and FIG. 6.

TABLE 1

| | Thickness of carbon layer (μm) | |
|---|---|---|
| Reaction time | Examples | Comparative Examples |
| 15 min. (Ex. 2, Comp. Ex. 2) | 0.9 | 3.5 |
| 30 min. (Ex. 3, Comp. Ex. 3) | 4.8 | 19 |
| 1 hour (Ex. 1, Comp. Ex. 1) | 10.3 | 21.5 |
| 2 hours (Ex. 4, Comp. Ex. 4) | 18.0 | 26.5 |
| 4 hours (Ex. 5, Comp. Ex. 5) | 36.5 | 31.5 |

As can be seen from Table 1, in each of Examples 1-5, the carbon layer thickness gradually increases with time and shows no rapid change in thickness. On the contrary, in each of Comparative Examples 1-5, a rapid change in thickness is observed at the early time of reaction (15-30 minutes). After that, the thickness does not increase significantly, and then becomes smaller than the thickness of each sample according to Examples.

This suggests that it is difficult to control the thickness of a carbon layer constantly with time during the formation of a carbon layer. It is estimated that such a drop in increment of thickness at the later time of reaction is caused by collapse and recombination of voids during the formation of a carbon layer membrane. However, in the case of Examples 1-5, the voids generated from the reaction with chlorine gas are filled with carbon decomposed from bubbled chloroform, thereby forming a carbon layer membrane with no change of porosity and showing an increase in thickness at a constant ratio.

Figure 5:
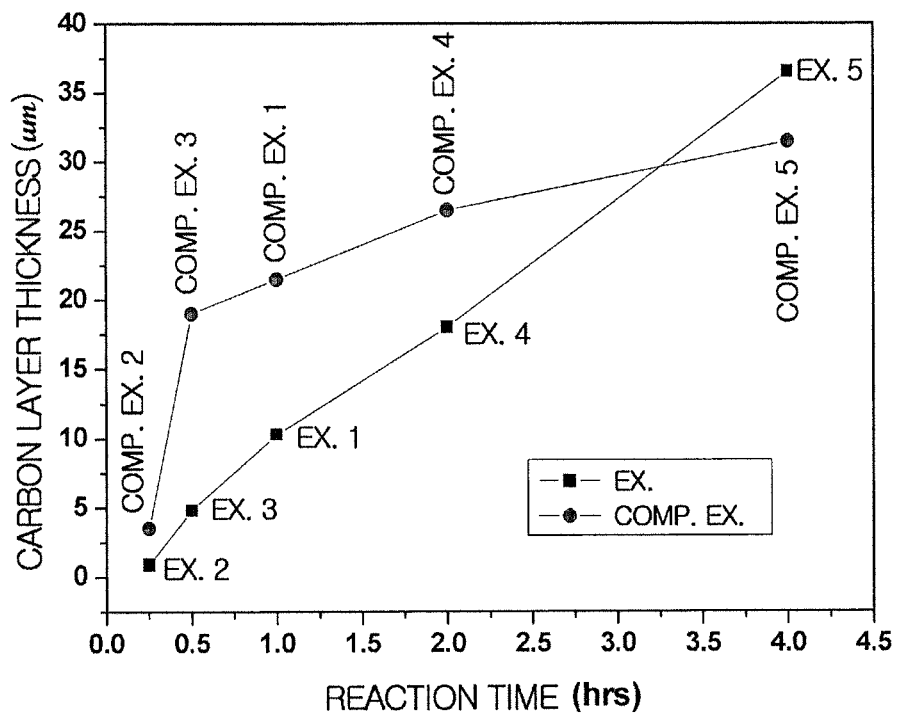
FIG. 5 is a graph illustrating the thickness of each carbon layer according to Examples as compared to that of each carbon layer according to Comparative Examples.
Figure 6:
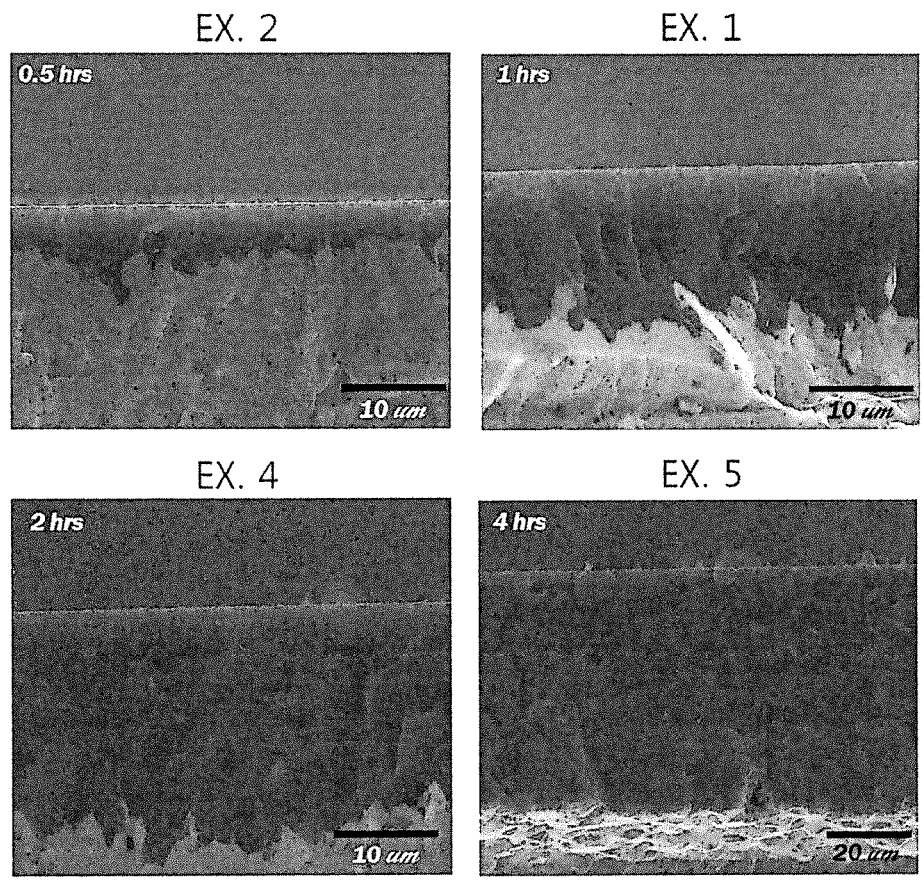
FIG. 6 is an SEM image showing a change in thickness of each carbon layer according to Examples as a function of time.

In addition, in the case of Examples 1-5, the reaction proceeds continuously while the voids are filled with carbon, followed by the growth of a crystal phase. As a result, the resultant carbon layer shows an increase in thickness with time at a constant ratio. However, in the case of Comparative Examples 1-5, there is no growth of a crystal phase, and thus the carbon layer shows a rapid increase in thickness to a certain degree, and then shows a significant drop in increment of thickness. Such results can be also seen from FIG. 5 and FIG. 6. FIG. 5 shows a gradient of the above-described pattern of a change in thickness. Particularly, while each of Examples shows a continuous increase with a constant gradient, each of Comparative Examples shows a rapid increase at the early time of reaction and then a significant drop in increment after 30 minutes or more. In addition, FIG. 6 is an SEM image showing a change in thickness of carbon layer. It can be seen from FIG. 6 that the thickness of carbon layer increases directly with a factor of about 2 with time.

As can be seen from the above test results, reaction of SIC with chlorine gas and chloroform, particularly of carbide ceramics with halogen gas and a carbon compound allows the preparation of a carbon layer that shows a constant increase in thickness with the lapse of reaction time.

Test Example 3: Determination of Surface Roughness of Carbon Layer

Each of the samples according to Examples 1 to 7 and Comparative Examples 1 to 5 is subjected to a test for determination of surface roughness of carbon layer. The test is carried out by measuring RMS roughness with a two-dimensional surface roughness tester. The results are shown in the following Table 2, FIG. 7 and FIG. 8.

TABLE 2

| | Roughness of carbon layer (nm) | |
|---|---|---|
| Reaction time | Examples | Comparative Examples |
| 15 min. (Ex. 2, Comp. Ex. 2) | 169 | 2712 |
| 30 min. (Ex. 3 Comp. Ex. 3) | 92 | 2816 |
| 1 hour (Ex. 1, Comp. Ex. 1) | 103 | 3029 |
| 2 hours (Ex. 4, Comp. Ex. 4) | 128 | 3087 |
| 4 hours (Ex. 5, Comp. Ex. 5) | 193 | 3129 |
| 2 hours (Ex. 6, Comp. Ex. 4) | 57 | 3087 |
| 4 hours (Ex. 7, Comp. Ex. 5) | 85 | 3129 |

As can be seen from Table 2, Example 6 and Example 7 including co-injection of chlorine gas and methane gas provide a significantly low roughness. It is thought that addition of methane gas is effective for reducing voids and inhibiting shrinkage of voids, resulting in a significant decrease in surface roughness of CDC.

In addition, Example 3 using a reaction time of 30 minutes provides a low roughness, and shows a roughness value 15-30 times lower than the overall roughness of Comparative Examples, thereby showing a significantly smooth surface.

This suggests that when voids are filled with carbon according to Examples, it is possible to improve surface roughness significantly as compared to Comparative Examples.

Figure 7:
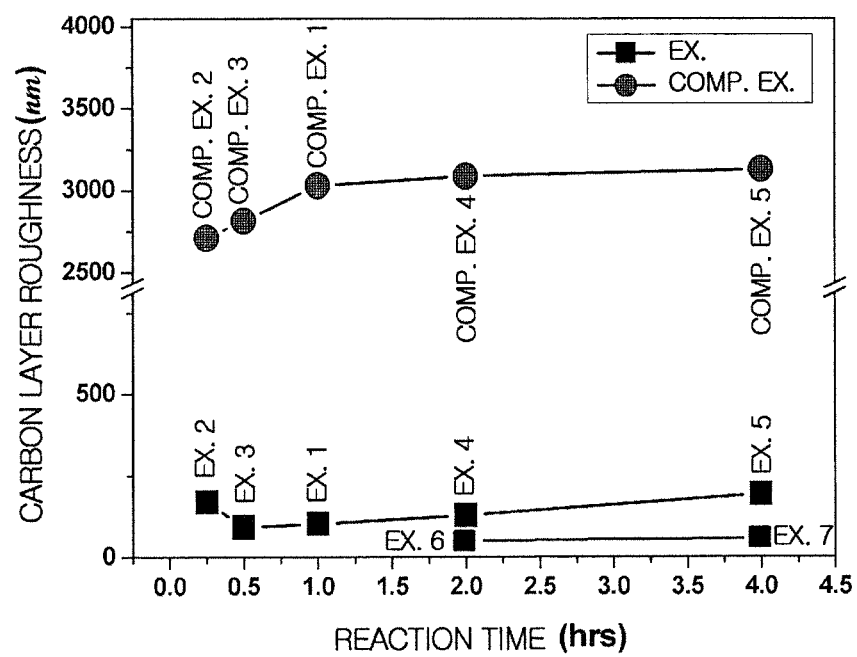
FIG. 7 is a graph illustrating the roughness of each carbon layer according to Examples as compared to that of each carbon layer according to Comparative Examples.

In addition, as can be seen from the graph of FIG. 7, Examples show a significantly lower roughness value as compared to Comparative Examples, thereby providing a carbon layer having a surface that is not rough but smooth.

Figure 8:
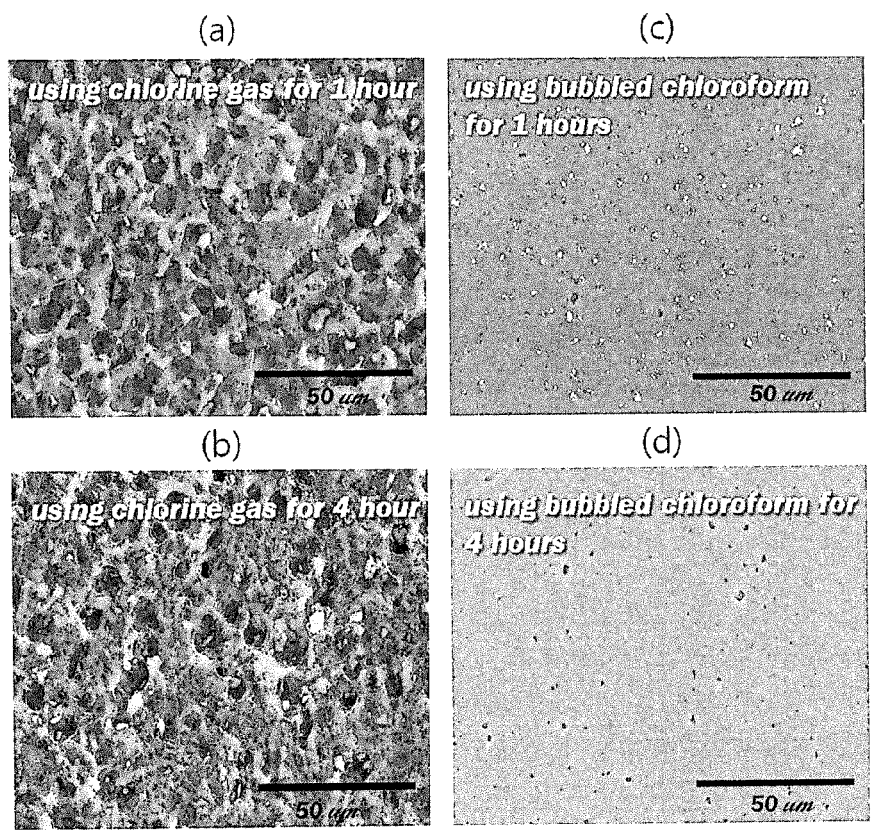
FIG. 8 is an SEM image showing the roughness of each carbon layer according to Examples as compared to that of each carbon layer according to Comparative Examples.

Further, the SEM image of FIG. 8 shows non-filled voids in the case of Comparative Examples, which demonstrates that Comparative Examples have a rough surface (see a and b in FIG. 8). On the contrary, in the case of Examples, the voids are filled with carbon to provide a smooth surface. Particularly, Example 5 (d in FIG. 8) shows a significant decrease in non-filled voids as compared to Example 1 (c in FIG. 8).

As a result, it can be seen that Examples provide a significantly improved surface roughness as compared to Comparative examples, thereby allowing the preparation of a carbon layer having improved roughness.

Test Example 4: Determination of Frictional Coefficient of Carbon Layer Surface

Each of the samples according to Examples 1 to 7 and Comparative Examples 1 to 5 is subjected to a test for determination of frictional coefficient of carbon layer. The test is carried out by the pin-on-disk method according to ASTM G99-95a standards. The results are shown in FIG. 9.

Figure 9:
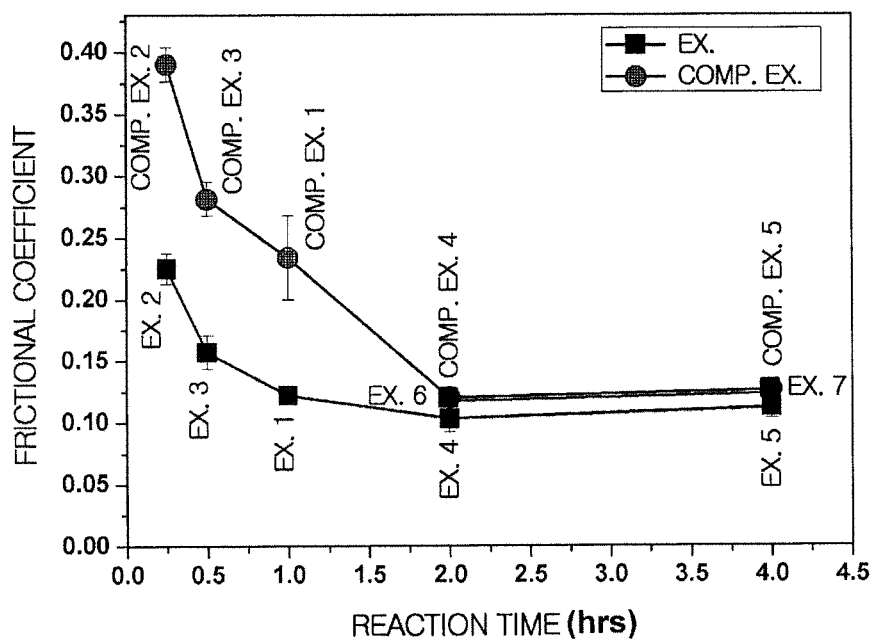
FIG. 9 is a graph illustrating the frictional coefficient of the surface of each carbon layer according to Examples as compared to that of each carbon layer according to Comparative Examples.

As can be seen from FIG. 9, both Examples and Comparative Examples show a significant drop in frictional coefficient with the lapse of reaction time. However, Examples show a significantly lower initial frictional coefficient as compared to Comparative Examples. Particularly, after 4 hours of reaction, Example 5 shows a lower frictional coefficient as compared to Comparative Example 4.

This suggests that Examples reduce frictional coefficients significantly even at the early time of reaction and show lower frictional coefficients even after the lapse of reaction time.

Therefore, the above results demonstrate that Examples show significantly lower frictional coefficients even at the early time of reaction as compared to Comparative Examples. Thus, it can be seen that Examples reduce the frictional coefficient of carbide ceramics while decreasing the manufacturing time, and thus are useful for contact portions of machines, or the like. It is thought that this is because the voids are filled with carbon to reduce stress and to improve the overall hardness of the carbon layer.

In addition, Examples 6 and 7 show an effect of reducing frictional coefficients due to an increase in roughness and density caused by addition of methane. The amorphous carbon layer formed finely on the surface due to the decomposition and synthesis of methane provides Examples 4 and 5 with higher frictional coefficients.

Test Example 5: Determination of Wearing Ratio of Carbon Layer Surface

Each of the samples according to Examples 1 to 7 and Comparative Examples 1 to 5 is subjected to a test for determination of wearing ratio of carbon layer. The test is carried out by using a two-dimensional shape tester according to ASTM G99-95a. The results are shown in FIG. 10.

Figure 10:
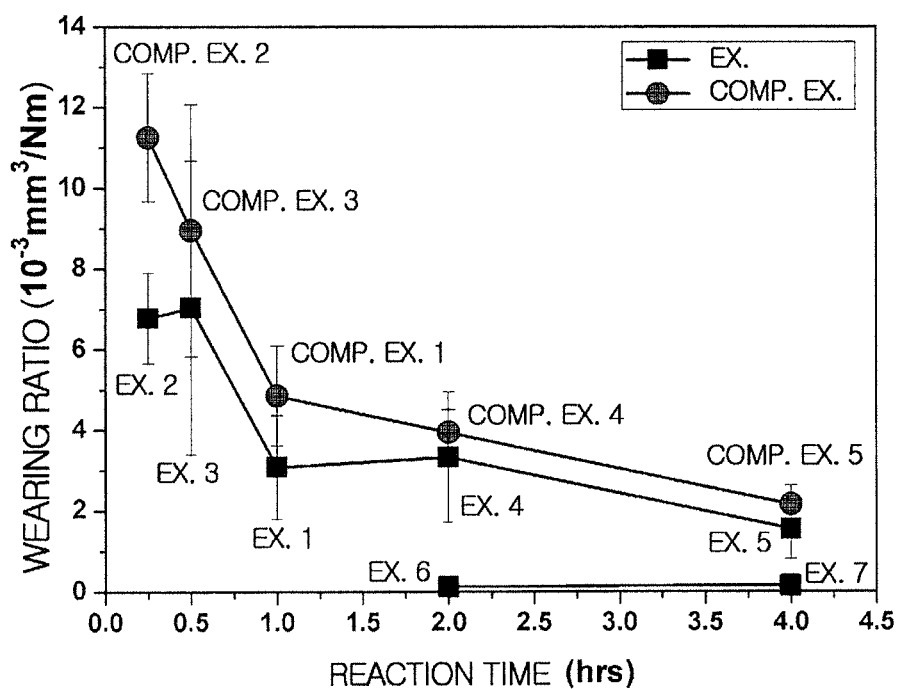
FIG. 10 is a graph illustrating the wearing ratio of the surface of each carbon layer according to Examples as compared to that of each carbon layer according to Comparative Examples.

As can be seen from FIG. 10, Examples show wearing ratios at least 1.5 times lower than the wearing ratios of Comparative Examples even at the early time of reaction. In addition, as in the case of determination of frictional coefficient, Examples still show lower wearing ratios even after the lapse of reaction time. It is thought that such improvement in wearing ratio results from the fact that the voids are filled with carbon to improve hardness. In other words, the above-results showing a significant drop in wearing ratio suggests that the carbon layer according to the present disclosure has improved hardness, and thus has significantly lower possibility of wearing. Therefore, it can be seen from the above results that the carbon layer according to the present disclosure has significantly improved hardness.

In addition, Examples 6 and 7 including addition of methane show improved density of the carbon layer, resulting in a significantly drop in wearing ratio of CDC layer.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing a carbon layer derived from carbide ceramics, comprising the steps of:
   (a) heating Silicon Carbide(SiC), carbide ceramics, sintered at high temperature on electric furnace to form voids by extracting Silicon(Si) from the Silicon Carbide(SiC),
   (b) injecting a liquid-phase chloroform to the electric furnace while being bubbled with argon gas in order to carry out a reaction with the heated Silicon Carbide (SiC) to form a carbon layer while filling with carbon in the voids, and
   (c) after step (b), injecting argon gas and hydrogen gas to the electric furnace to remove residual chlorine compounds,
   wherein the voids are filled with carbon by methane gas decomposed from the liquid-phase chloroform injected at step(b).

* * * * *